July 25, 1944.    A. A. CAMPBELL    2,354,197
MEASURING DEVICE
Filed Aug. 3, 1942
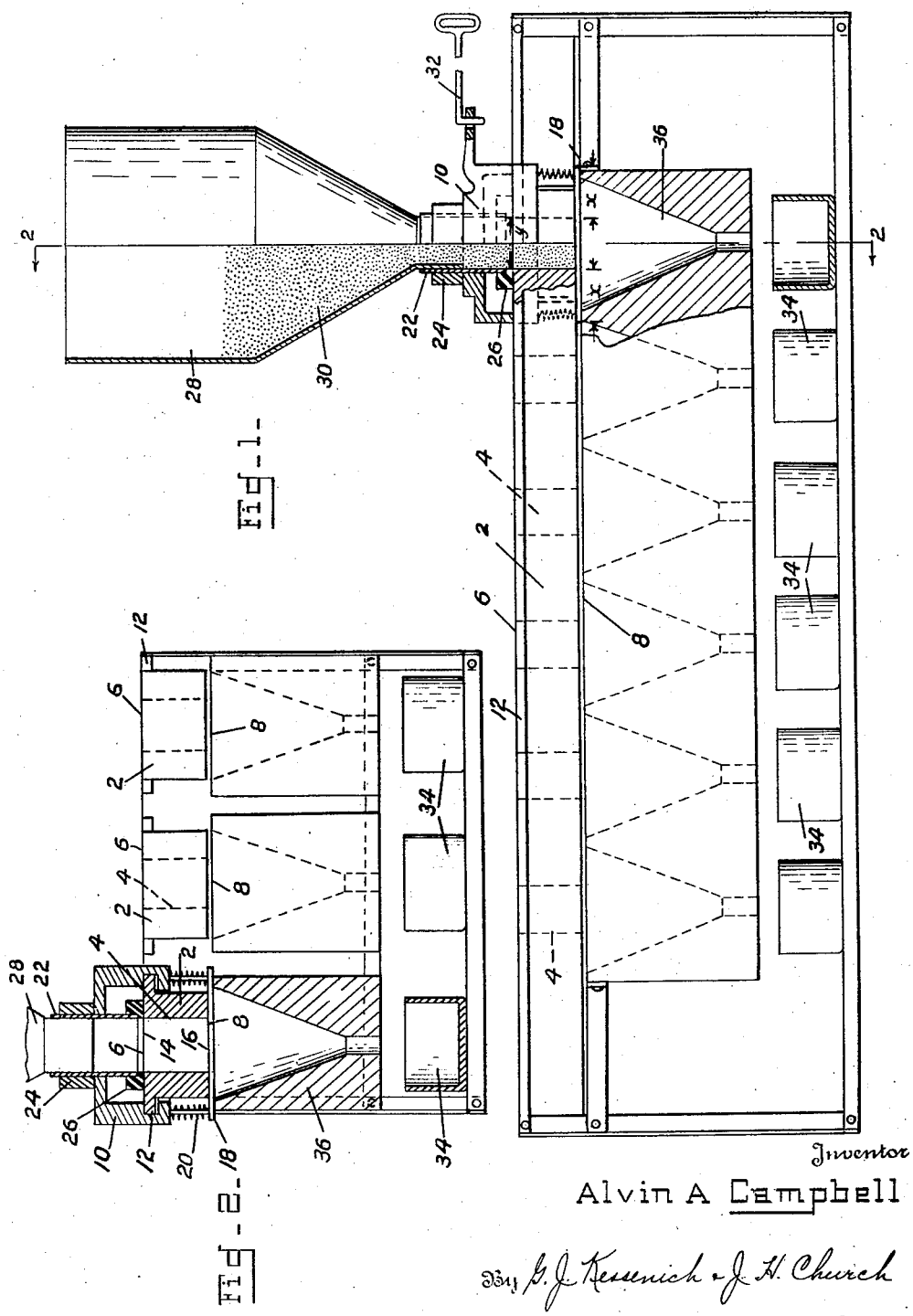
Inventor
Alvin A Campbell Patented July 25, 1944

2,354,197

UNITED STATES PATENT OFFICE 2,354,197

MEASURING DEVICE

Alvin A. Campbell, Hackettstown, N. J.

Application August 3, 1942, Serial No. 453,465

4 Claims. (Cl. 222—162)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to a measuring device, particularly to a device for measuring out a predetermined quantity of granular material, such as powder.

One problem in ammunition manufacture is the production of a great many rounds having very nearly the same firing characteristics. For maximum uniformity, the rounds should contain substantially equal quantities of the various materials going to make up a round. The problem of measuring out equal quantities is particularly acute in the making of primers, because the quantity measured out altogether is so small that a very small variation causes a substantial percentage difference.

Accordingly, it is an object of this invention to provide a measuring device which is capable of filling a number of receptacles with predetermined quantities of material in an efficient and simple manner. A perforated table has mounted on it, for movement relative thereto, a hopper which communicates successively with the perforations as the hopper moves along the table. A closure plate for the under side of the holes in the table moves along with the hopper, permitting filling of the holes with the desired quantity of material from the hopper, and emptying that material into receptacles disposed beneath the table.

The specific nature of the invention as well as other objects and advantages thereof will clearly appear from a description of a preferred embodiment as shown in the accompanying drawing in which:

Fig. 1 of the drawing shows a view in elevation of an application of the invention, with parts broken away and in section.

Fig. 2 is a view in section substantially on line 2—2 of Fig. 1.

Referring to the figures in detail, 2 is a table having holes 4 therein, such as a plate of a given thickness having perforations of a diameter to provide holes having the desired volume. If desired, several tables 2 may be disposed side by side, as seen in Fig. 2. Tables 2 are preferably provided with flat upper and lower surfaces 6 and 8 respectively. A carriage 10 is mounted for movement along table 2, as by the engagement of side rails 12. Holes 4 have each an opening 14 into the upper surface 6 and an opening 16 into the lower surface 8, as shown in Fig. 2. The lower opening 16 is adapted to be blocked by a closure 18 carried by carriage 10 and biased against lower surface 8 by tension springs 20. Communicating with opening 14 in the upper surface is a conduit which has passage through the carriage and includes a tube 22 mounted in the carriage by a collar 24, and a yieldable member 26 on the tube and in direct contact with upper surface 6 of table 2. Member 26 is intended to serve as a wiper in the movement of the carriage along table 2, to insure against more than the predetermined quantity of powder being introduced into the opening. If desired, collar 24, tube 22, and the opening in carriage 10 through which the tube extends may be provided with cooperating threads to permit vertical adjustment of the tube and wiper, or other means equally suitable may be used.

Mounted in tube 22 and supported by carriage 10 is a reservoir or hopper 28 to carry a supply of material 30 to be measured, such as powder. A handle 32 may be secured or connected to carriage 10 to permit its movement along table 2.

Receptacles 34 may be disposed below table 2 to receive the material discharged from hole 4 as opening 16 is uncovered by closure 18. In this application of the invention, receptacles 34 are primer cups, but the invention is of course not limited to the loading of primer cups. Funnel shaped guides 36 may if desired be interposed between table 2 and cups 34.

Attention is now directed to the fact that the amount of overlap of closure 18 over opening 16, represented by $x$, Fig. 1, is at least as great as the internal dimension $y$ of wiper 26 in the direction of motion of carriage 10. This fact insures that the conduit effecting communication between reservoir 28 and hole 4 will be completely out of registry with the hole before closure 18 has moved far enough to uncover opening 16. This fact determines that the quantity of material 30 released to receptacle 34 is precisely that contained in hole 4 filled "level full."

*Operation.*—With hopper or reservoir 28 supplied with material 30 to be distributed in predetermined quantities to receptacles 34, carriage 10 is moved to effect communication of the hopper with upper opening 14 of a selected hole 4, as seen in the drawing. In this position of the parts, closure 18 blocks opening 16, and hole 4 fills up with material 30 from the hopper. Carriage 10 is then moved along table 2 toward the next hole. The first movement of the carriage causes the conduit to be disengaged from hole 4 as wiper 26 moves along surface 6, wiping the material in the hole to the level of this surface. When communication between hole 4 and hopper 28 is completely cut off, closure 18 uncovers opening 16, permitting the measured substance 30 to fall into receptacle 34 by way of guide 36. In this manner, an entire series of receptacles 34 may be supplied with predetermined quantities of the material 30.

I claim:

1. In a measuring device, a flat table, the top thereof having spaced successively arranged holes therethrough forming containers of predetermined capacity, a carriage slidably mounted on the table top and arranged to be brought selectively over said holes, means on the table top and means on the carriage coacting to guide the carriage in its movement over the table top, a plate carried by the carriage and forming a closure for the bottom of the selected hole, means between the carriage and the closure plate for holding said plate snugly against the underside of the table top, a material conduit carried by the carriage and extended to and adapted to register with the upper end of a selected hole, and yielding means carried by the conduit and contacting the upper surface of the table top to level off the top of the material in the hole as the carriage moves from one hole to another, the closure plate being of a dimension with respect to the area of the hole in the conduit that said conduit will be moved completely out of registry with the selected hole before the closure uncovers the bottom of the hole.

2. The invention of claim 1, characterized in that the conduit carried by the carriage is provided with a material reservoir opening into the conduit.

3. The invention of claim 1, characterized in that the means between the closure plate and the carriage for holding the plate against the lower face of the table top comprises guided tensioned springs connecting the plate and the carriage, and that the means for slidably mounting the carriage on the table top comprises oppositely disposed rails on the table top entering correspondingly shaped grooves in the carriage, and that the yielding means carried by the conduit comprises a ring of rubber or like material.

4. The invention of claim 1, characterized in that the carriage is provided with an elongated rod by which it may be manually moved along the table top.

ALVIN A. CAMPBELL.